May 5, 1931.                 H. J. MURRAY                  1,803,535
                AUTOMATIC RELEASE FOR GEAR SYNCHRONIZERS
                     Original Filed April 21, 1923
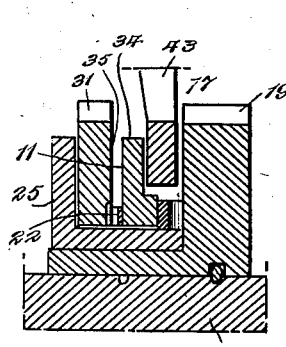
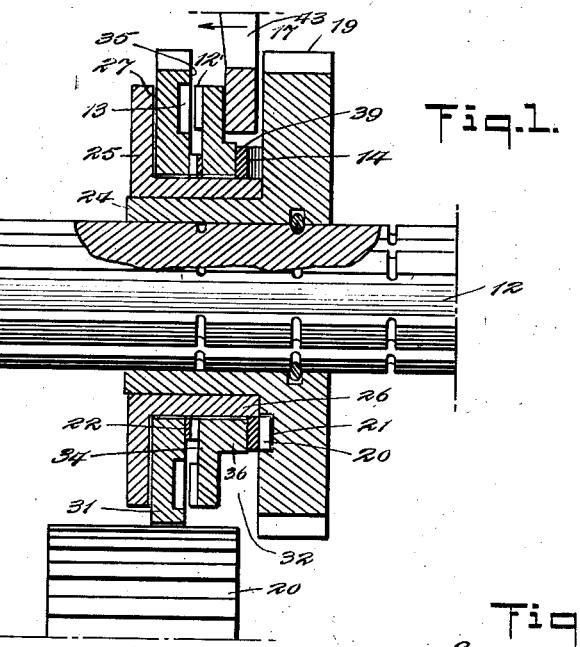
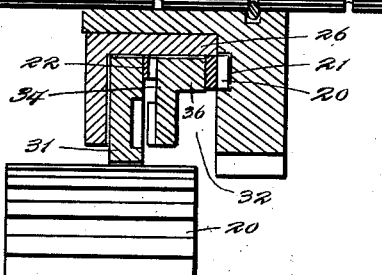
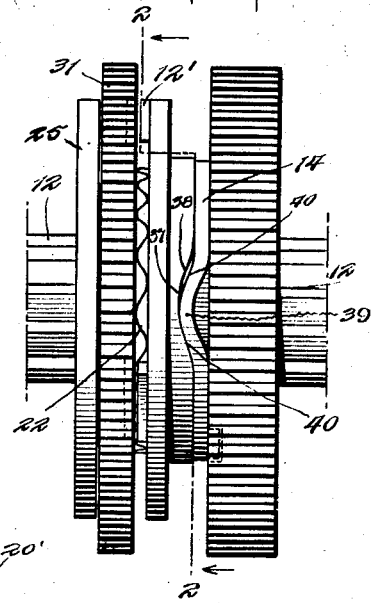
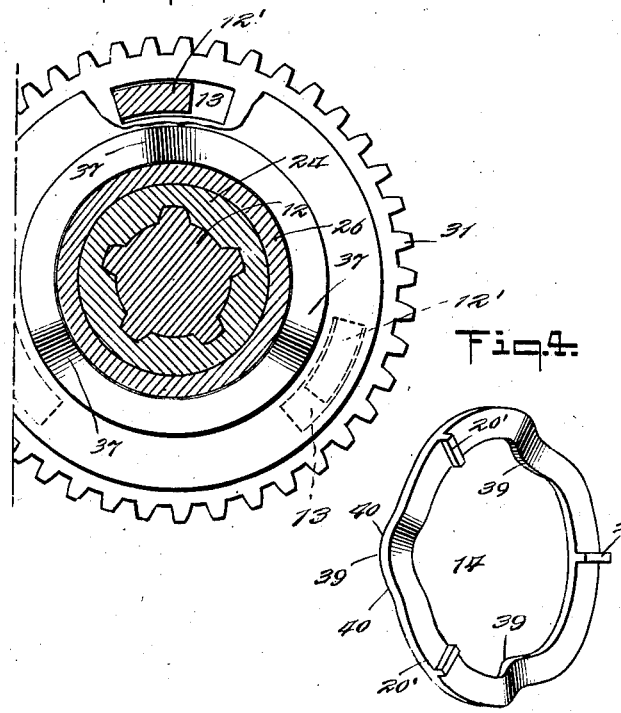
INVENTOR
Howard J. Murray
BY
Warren S. Orton.
ATTORNEYS Patented May 5, 1931

1,803,535

UNITED STATES PATENT OFFICE

HOWARD J. MURRAY, OF NEW YORK, N. Y., ASSIGNOR TO R. M. COMPANY, INC., OF EAST PITTSBURGH, PENNSYLVANIA, A CORPORATION OF DELAWARE

AUTOMATIC RELEASE FOR GEAR SYNCHRONIZERS

Application filed April 21, 1923, Serial No. 633,610. Renewed September 29, 1930.

The invention relates in general to a synchronizer for causing two rotating power members, generally designated as rotors, and herein shown to be gears to tend to approach the same speed prior to intermeshing or to assume some other operative speed relation.

The present disclosure constitutes a development and improvement in an automatic clutch synchronizer of the type disclosed in my pending application, filed January 23, 1923, bearing Serial No. 614,502. In this prior application there was disclosed a form of gear synchronizer in which power gears were caused to assume the same speed through the agency of a friction clutch, the power for actuating the same being derived from the mechanical rotary movement of one of the gears to be synchronized. The movement of the clutch was attained by causing one of the power gears to actuate a cam which in turn shifted a clutch controlling member axially in order to effect the clutching of the synchronizer in its driving relation between the power gears. In this prior disclosure the cam was a rigid member which was jammed into operative position immediately on the application of the manual or other inaugurating force applied to the hand lever or other control member. Under some circumstances, such as for instance, where the gears are moving at high relative speed and where one or both gears are turning with strong torque forces, the powerfully rotating cam actuating gear tends to impose a strain on the parts not necessary to the proper synchronizing of the gears and which is apt to rupture the parts.

Accordingly, the primary object of the present invention is to provide an improved form of camming movement for shifting the clutch element which will retain all of the advantages inherent in the structure disclosed in the companion application, and which at the same time will provide for some flexibility in the camming engagement so as to release the parts from breaking, or even high strains.

It is obvious that the greater the relative torque force between the rotors to be synchronized the greater is the amount of work necessary to be done in order to overcome this relative force and to deprive the rotors of their relative speed. In the above identified application the time delay necessary to effect this work was provided by the time delay consumed during the operative movement of the cam. It is quite obvious, however, that at high rotary speeds this time delay is exceedingly brief with a resulting severe strain on the engaged parts. Accordingly, the invention features a modification of the previous cam actuation so as to impose a resistance to extremely high torque forces and which will, in effect, tend to brake the relative movement between the gears to be synchronized until a period of time has lapsed sufficient to permit the effective operation of the cam in its clutch shifting action in bringing the gears towards the same speed.

I attain this object broadly by designing the cam as a resilient spring capable of normally maintaining a shifting engagement with the movable clutch element but which can be moved automatically into an inoperative position, and thus permit the rotors to pass idly but under the frictional restraint of the spring until the tension of the spring is enabled to affect its camming operation.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a fragmentary view of parts of two gears of the type found in transmission casings of conventional form, equipped with a preferred embodiment of the inventive features disclosed in this and in the above identified application;

Figure 2 is a transverse sectional view taken on the line 2—2 of Figure 3;

Figure 3 is a view in side elevation of part of the construction shown in Figure 1;

Figure 4 is a detailed perspective view of the resilient cam ring shown in the preceding figures; and Figure 5 is a fragmentary detail showing a modified form of clutch between the actuator and the synchronizer ring and otherwise corresponding to the showing in Figure 1.

In the following description and in the claims, parts will be identified by specific names for convenience of expression but they are intended to be as generic in their application to similar parts as the art will permit.

In the drawings there is shown a power shaft 12, which for the purpose of its disclosure may be considered as a propeller shaft operatively connected to drive the traction wheels of an automobile. A sliding gear unit 17 is keyed to the shaft so as to rotate therewith and includes a power gear 19 designed to mesh with a gear 20 keyed to another shaft (not shown) and which may be the jack shaft of a transmission set. In this disclosure it is assumed that it is desired to synchronize the gears 19 and 20. The gear 19 is provided with a sleeve extension 24 on which is shrunk a stop end plate 25 having a hub 26 providing a circular bearing for the synchronizer hereinafter described. The stop plate is provided on its inner side with a radially extending bearing face 27 designed to constitute one element of a friction clutch of the side face type.

The synchronizer herein featured includes a synchronizing gear 31 constituting the co-acting element of the friction clutch. The gear 31 is mounted loosely on the hub 26 for rotary movement about the axis of the shaft 12 and is free to slide for a limited movement axially to and from its clutching engagement with the friction face 27. The unit 17 also carries a light-weight actuator ring 34 which is free to have slight axial movement to and from the adjacent face 35 of the synchronizing gear 31 and is mounted on the sleeve 26 to have a freedom of rotary movement. The space between the actuator 34 and the gear 19 provides a peripheral groove 32 into which extends a yoke fork 43 actuated from a control rod (not shown) as is usual in transmission casings.

From this construction it will be understood that the movement of the yoke fork or arm 43 from right to left in its movement to shift the gear 19 into mesh with the gear 20 will first cause the actuator ring to bear against the synchronizing gear and will act therethrough to cause the synchronizing gear to bear against the fixed stop provided by the end plate 25. At the same time the actuator ring is moved into clutching engagement with the synchronizer to turn therewith as a single unit. The clutching engagement between the actuator ring and the adjacent side of the synchronizing ring may be a flat, frictional surface 11 as shown in Figure 5, but preferably is a positive clutch and as an illustration of one such clutch reference is made to Figure 1, which shows teeth 12' disposed to engage in relatively long, circumferentially disposed slots 13 in the adjacent side of the synchronizing gear as more particularly shown in Figure 2. The loose tooth and slot connection thus provided insures a meshing of the teeth in the longer slot even when rotating at high relative speed.

The actuator ring 34 includes a hub 36 in the form of a collar mounted loose on the hub 26. The edge of the collar facing the gear 19 is provided at a plurality of points, shown to be three in number, with curved recesses 37 outlined on opposite sides by wedge surfaces 38 converging towards the end plate 25 and coacting to form a wide angle of approximately 40° with reference to a plane containing the axis of rotation as shown in Fig. 3.

A resilient cam ring 14 is positioned between the gear 19 and the recessed edge of the collar forming part of the actuator. This ring is secured to rotate with the unit 17 by means of fingers 20' extending therefrom and engaging in recesses 21 in the adjacent face of the gear 19 as shown in Figure 1. The ring is corrugated transversely of its plane to provide three resilient projections 39, corresponding in general to the configuration of the recesses 37 in which they are designed to move. The projections are each of less length considered circumferentially than the corresponding dimension of the recess in which it moves as shown in Figure 3 so that there is a limited freedom of rotary movement between the stop plate and the collar even when the ring 14 is not distorted. The advanced and rear sides of each projection are formed of converging sides 40 for acting on whichever may be the advance surface 38 to form a wedging action between the unit 17 and the actuator ring 34. This camming action operates to resolve the rotary torque inherent in the unit 17 into a component acting in an axial direction to shift the actuator ring towards the end plate.

If desired, a weak spring 22 may be positioned between the actuator ring 34 and the synchronizing gear 31 for the purpose of maintaining the gear and actuator in their normal, inoperative, non-clutching relation but this spring is not needed where the engagement is frictional and in the case of the mechanical clutch the parts may be caused to assume their unclutched condition by any means usual for this purpose in separating clutch elements.

In operation and assuming that it is desired to move the gears 19 and 20 from their unmeshed position shown in Figure 1 into their fully meshed position as is usual, for instance, in providing for second speed drives in automotive power transmission mechanisms, the control 43 is shifted to the left from the position shown in Figure 1. The initial movement of the control lever acts to shift the actuator 34 into clutching engagement with the synchronizer gear 31. This may be a frictional clutching engagement as suggested in the form shown in Figure 5 or it may be a positive tooth engaging clutch as suggested by the form illustrated in Figures 1 and 2. The continued application of pressure against the side of the synchronizing gear will cause the same to move into frictional engagement with the fixed clutch plate 25. In this way the advanced side of the synchronizer gear will be in direct clutching engagement with the gear unit 17.

Irrespective as to whether or not the force applied to the lever 43 is sufficient to shift the synchronizer gear into bearing engagement with the stop plate 25 any force will be sufficient to retard whatever rotary movement may be possessed by the relatively light actuator 34, and there will be a resulting tendency of the actuator to stop or at least to retard its rotary movement if it should happen to be moving at the instant the shift lever is actuated. However, the stop plate together with the entire massive unit 17 is rotating with a powerful torque from the shaft 12. The rotation of the ring 14 which is secured to rotate with the unit 17 will cause one of the resilient faces 40 to bear circularly against the opposing face outlining the recess in the collar and due to the angle between the coacting faces the powerful torque effect of the turning unit will act to shift the actuator axially into a firm clutching engagement with the synchronizer gear and in turn will cause this gear to bear firmly against the stop plate. It is understood that the clutching of the synchronizer gear to the gear unit provides a positive driving connection between the shaft 12 and the gear 20 so as to cause the gears 19 and 20 to approach the same speed just prior to the movement of the teeth of the gears into their intermeshed relation. The resilient cams provided by the projections 39 on the ring 14 are relatively rigid so that under normal operation the device functions in the manner described in the above identified pending application and independent of any resiliency in the wedging cam ring 14.

The present disclosure is particularly designed to take care of those situations where the gears 19 and 20 possess high rotary relative movement and where a practically instantaneous wedging movement between the ring 14 and the actuator is apt to place a severe strain on the meshed parts. Under such conditions it is obvious that the resiliency of the projections 39 will permit the same to be moved towards a flat position of the ring 14 thus permitting the actuator to ride past the projections 39, and in this way the projections 39 are free to escape from the recesses 37. When free of the recesses, however, the resilient projections are bearing with a powerful frictional effort on the edge of the actuator so that there is momentarily interposed a high frictional resistance to the relative movement of the actuator and the ring. This resistance will quickly cause the parts to assume the same speed and when the springs 39 are sufficient to overcome the overrunning torque effect of the actuator the springs will engage in the next succeeding set of recesses and will then function with their camming movement to shift the actuator and thus cause a synchronizing of the power gears 19 and 20, as previously suggested.

Having thus described my invention, I claim:

1. In a gear transmission, the combination of a shaft, a gear unit slidably keyed to said shaft and including a stop element, a synchronizer carried by the unit and free to rotate thereon, said synchronizer including an actuator ring journalled for rotary movement on the unit and a synchronizer gear journalled for rotary movement on the unit and adapted to be clutched between the actuator ring and the stop element, said actuator ring provided on the side face opposite the synchronizer gear with a plurality of recesses having converging advance and rear walls inclined to a plane passing through the axis of rotation of the shaft and a corrugated resilient ring secured to the unit to rotate therewith and formed with a plurality of projections having similarly inclined converging walls and coacting to cause the actuator ring to bear on the synchronizer gear with a camming action in the event the unit tends to overrun the actuator ring in its rotary movement, the resiliency of the corrugated ring permitting relative rotary movement of the unit and actuator ring when the torque force acting between the same is sufficient to overcome the camming effect of the resilient ring on the actuator ring.

2. In a device of the class described, the combination of a rotating unit provided with one element of a clutch, a synchronizer including a synchronizing gear constituting the coacting element of the clutch and journalled on the unit, an actuator shiftable in one direction axially of the unit for clutching the synchronizer between the actuator and said clutch element, a resilient member carried by the unit to rotate therewith, and means acting between the resilient member and the actuator for causing the rotary movement of the resilient member to shift the actuator into its clutch acting position and the resiliency of said member permitting a slippage of the member idly past the actuator.

3. In a gear synchronizer, the combination of a pair of gears adapted to be shifted into a driving relation, a synchronizer for causing the gears to approach the same speed prior to moving into said driving relation, means for connecting the synchronizer to one of the gears, and spring controlled means operable when the synchronizer is so connected and controlled by the momentum of one of the gears for causing the synchronizer to function.

4. In a device of the class described, the combination of a support provided with a relatively fixed element of a friction clutch, an actuator slidable axially on the support, a synchronizer element disposed between the actuator and clutch element and adapted to be clutched therebetween and resilient camming means between the support and the actuator for causing a shifting of the actuator axially and into clutching engagement with the synchronizer element.

5. In a device of the class described, the combination of a shaft, a power gear keyed thereto, a synchronizer gear journalled for rotary movement on the power gear, a friction clutch for clamping the synchronizer gear to the power gear, a cam connection between the shiftable element of the clutch and the power gear including a curved spring capable of being sprung out of its operative camming position thereby to permit the power gear to slip past the shiftable element and means for retarding the free rotary movement of the shiftable clutch element to cause the clutch to function.

6. In a device of the class described, the combination of a pair of members mounted for rotary movement and adapted to rotate at different speeds, of a synchronizer for causing said members to approach the same speed, control means for operatively connecting the same to cause it to be actuated by the relative rotary movement of the members, said synchronizer including a resilient cam connection with one of the members and a clutching connection with the other member.

7. In a device of the class described, the combination of a pair of rotors, means for causing said rotors to approach the same speed, said means including a resilient wedging device operatively connected to be actuated by the relative rotary movement of rotors when acting under relatively small torque forces and adapted to be sprung into an inoperative non-wedging position for permitting the rotors to turn substantially independent of each other when the torque developed by the rotary movement of the rotors is sufficient to overcome the tendency of the wedging device to maintain its operative position.

8. In a device of the class described, the combination of a pair of gears adapted to be moved to and from an intergeared relation, synchronizing means energized by the power of one of the gears for causing them to approach the same speed prior to becoming intermeshed, and resilient means for causing the synchronizing means to become inoperative.

9. In a gear transmission, the combination of a pair of gears, means for synchronizing said gears prior to meshing the same, said synchronizing means including a clutch and a cam spring operatively connected to the clutch to wedge the same into its clutching position and said clutch including a movable element adapted to react on the cam spring to distort the same out of its wedging position and thus resist the wedging action of the cam spring.

10. In a synchronizer, the combination of two members mounted for independent rotary movement about a common axis of rotation and having relative axial movement, a cam spring including a plurality of circumferentially spaced resilient cams operatively connected to bear on the other member and cause relative axial movement between the members.

11. In a device of the class described, the combination of two members mounted for independent rotary movement and having relative axial movement, a floating driving connection between the numbers for causing one of the members to impart its rotary movement to the other and said connection including resilient intermittently operable means controlled by the relative rotary movement between said members for effecting said axial movement and other resilient means tending to oppose the action of said intermittently operable resilient means.

12. In a device of the class described, the combination of a clutch element and a power member mounted for relative rotary movement, means tending to maintain the clutch element in an inoperative, non-clutching position, means actuated by the rotary movement of said power member for shifting said clutch element into operative position and against the resistance of said first named means, and said means including a resilient connection intermittently resisting the tendency of the power member to rotate the clutch element.

13. In a device of the class described, the combination of a clutch controlling element and a power element normally having a freedom of relative rotary movement, resilient means operatively connected for braking the relative movement between the clutch controlling element and the power element thereby to cause said elements to approach the same speed and control means for disposing said resilient means in operative position.

14. In a device of the class described, the combination of a pair of members mounted for relative rotary movement, one of said members provided with a resilient projection disposed in the path of rotation of a part of the other member and adapted to be distorted thereby to constitute a resilient brake for causing the members to approach the same speed.

15. In a device of the class described, the combination of a clutch element, mounted for rotary movement, a power member, a multiple acting spring camming device between the power member and the clutch element, controlled by the relative rotary movement between the power member and clutch element for moving the clutch element into its clutching position and control means operatively disposed to brake the freedom of rotary movement of the clutch element thereby to cause the camming device to shift the clutch element into operative position.

16. In a gear synchronizer, the combination of a clutch element mounted for rotary movement, a spring for moving the same axially into an inoperative non-clutching position, a stop for limiting said axial movement, said stop mounted for rotary movement, and a resilient cam connection between said stop and clutch element actuated by the relative rotary movement between the stop and clutch element for shifting the latter into its operative clutching position against the action of said spring.

17. In a device of the class described, the combination of two members mounted for independent rotary movement and having relative axial movement, a driving connection adapted to be disposed for causing one of the members to impart its rotary movement to the other when turning at approximately the same speed and said connection including resilient intermittently operable means controlled by the relative rotary movement between said members for imposing a braking action on the relative rotary movement of the members while one of the members is overrunning the other and manually actuated control means for causing said connection to become operative.

18. In a device of the class described, the combination of two clutch forming elements having a common axis of rotation and normally having a slight freedom of relative rotary movement, said elements when in operative position provided with axially extending projections from one engaging in recesses in the other and engaging at a plurality of points spaced apart circumferentially of said axis, the projections on one of said elements being resilient and operatively disposed to engage in the recesses for braking the relative movement between said elements thereby to cause said elements to approach the same speed.

19. In a device of the class described, the combination of two rotors, mechanism therebetween for causing one to approach the speed of the other, said mechanism including a pair of clutch forming members mounted for relative rotary movement about a common axis, one of said members including a resilient part disposed in the path of rotation of a part of the other member and adapted to be distorted thereby when one of the members tends to override the other, and thus constitute a resilient brake for causing the members to approach the same speed and said members providing a one-to-one drive when at the same speed with the resilient part of one member in the path of rotation of the part of the other member.

20. In a device of the class described, the combination of a pair of clutch elements mounted for rotary movement about a common axis and including intermeshing projections, means for shifting one of the elements axially and for interposing a resistance to its freedom of rotary movement, one of the elements comprising a plurality of resilient projections adapted to permit one of the elements to overrun the other while imposing a braking action on the relative movement.

21. In a device of the class described, the combination of two power transmitting rotors provided with means for mechanically driving one from the other when disposed in interdriving relation, synchronizing mechanism for causing the rotors to approach a desired speed, said mechanism including a friction clutch having one of its elements connected to one of the rotors to turn therewith, means forming a mechanical clutch between the other element of the friction clutch and the other rotor, and a control operatively connected to effect in sequence the movement of said mechanical clutch, to connect said other rotor positively with the friction clutch, the movement of the friction clutch into operative position to connect the two rotors to drive one from the other frictionally and a final movement of the rotors into their positive interdriving relation.

22. In a device of the class described, the combination of two power transmitting rotors provided with means for mechanically driving one from the other when disposed in interdriving relation, synchronizing mechanism for causing the rotors to approach a desired speed, said mechanism including a pair of elements mounted for rotary movement about a common axis and capable of a slight axial movement, one of said elements provided with a recess and the other provided with a resilient member adapted to intrude into said recess and thus impose an intermittent braking effect and incidental frictional resistance to the freedom of relative movement of the elements, one of said elements being connected to one of the rotors to turn therewith, means providing a positive mechanical drive with the other rotor and a control for causing in sequence an intermittently acting friction drive and a mechanical drive between the rotors.

23. In a device of the class described, the combination of a pair of gears, synchronizing means for causing said gears to approach a common speed, said means including a pair of elements coacting to form a friction clutch, one of the elements carried by the gear on which it is mounted and the other element geared to the other gear to rotate therewith, control means engaging said last named element to move the clutch into position to connect said gears and normally inoperative safety means responsive to an abnormal actuation of said control means for rendering said connection inoperative.

24. In a device of the class described, the combination of a pair of power gears, synchronizing means carried by one of the gears for causing the same to approach a common speed, said means including a friction clutch with one element secured to the gear on which it is mounted and the other element provided with a synchronizer gear adapted to mesh with the other power gear, means engaging the clutch elements to move them relative to each other into clutching engagement, thereby to provide a driving connection between the power gears and means for causing said connection automatically to become functionally inoperative when the power gears are restrained from approaching a common speed.

Signed at New York city, in the county of New York and State of New York this 18th day of April, A. D. 1923.

HOWARD J. MURRAY.